US012725828B2

(12) United States Patent
Amin et al.

(10) Patent No.: US 12,725,828 B2
(45) Date of Patent: Sep. 1, 2026

(54) IN-OPERANDO ELECTROCHEMICAL DENDRITE HEALING IN LITHIUM-ION BATTERY CELLS

(71) Applicant: UT-Battelle, LLC, Oak Ridge, TN (US)

(72) Inventors: Ruhul Amin, Oak Ridge, TN (US); Ilias Belharouak, Oak Ridge, TN (US); Anand Vasudevbhai Parejiya, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 915 days.

(21) Appl. No.: 17/954,479

(22) Filed: Sep. 28, 2022

(65) Prior Publication Data

US 2023/0108561 A1 Apr. 6, 2023

Related U.S. Application Data

(60) Provisional application No. 63/251,744, filed on Oct. 4, 2021.

(51) Int. Cl.

| | |
|---|---|
| ***H01M 10/0562*** | (2010.01) |
| ***H01M 4/38*** | (2006.01) |
| ***H01M 10/0525*** | (2010.01) |
| ***H01M 10/42*** | (2006.01) |

(52) U.S. Cl.

CPC ....... *H01M 10/0562* (2013.01); *H01M 4/382* (2013.01); *H01M 10/0525* (2013.01); *H01M 10/4235* (2013.01)

(58) Field of Classification Search

None

See application file for complete search history.

(56) References Cited

U.S. PATENT DOCUMENTS

| | | | | |
|---|---|---|---|---|
| 5,536,599 | A * | 7/1996 | Alamgir | H01M 10/4235 429/336 |
| 10,426,383 | B2 * | 10/2019 | Huang | A61B 5/14865 |
| 2015/0104679 | A1 * | 4/2015 | Trimble | H01M 12/02 429/49 |
| 2020/0112050 | A1 * | 4/2020 | Hu | H01M 10/056 |
| 2021/0050628 | A1 * | 2/2021 | Li | H01M 4/5815 |

OTHER PUBLICATIONS

Parejiya et al., "Electrochemical Healing of Dendrites in Garnet-Based Solid Electrolytes", Oct. 8, 2020, ACS Publications (Year: 2020).*

* cited by examiner

*Primary Examiner* — Niki Bakhtiari
*Assistant Examiner* — Dustin Van Kirk
(74) *Attorney, Agent, or Firm* — WARNER NORCROSS + JUDD LLP

(57) ABSTRACT

A method of reviving a lithium-ion battery cell in which dendrites are formed providing a lithium-ion battery cell including a lithium-metal-containing electrolyte and one of a graphite or a lithium-metal-containing anode. Lithium dendrites are formed at an anode/electrolyte interface in the cell and extend into the electrolyte of the cell. The method further includes electrochemically healing the battery cell by actively applying a plurality of continuous low current density galvanostatic charge-discharge cycles to the battery cell. Lithium metal is thusly oxidized from tips of the dendrites thereby causing dissolution of the dendrites.

20 Claims, 6 Drawing Sheets

Li metal

Solid electrolyte

Li metal

Pristine cell dendrites

Dendrite formation $Li^+$ $e^-$

Dendrite healing

IN-OPERANDO ELECTROCHEMICAL DENDRITE HEALING IN LITHIUM-ION BATTERY CELLS

CROSS-REFERENCE TO RELATED APPLICATIONS

This application claims the benefit of U.S. Provisional Application 63/251,744, filed Oct. 4, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in the invention.

FIELD OF THE INVENTION

The present invention relates to lithium-ion batteries, and more particularly to recovery of lithium-ion battery cells in which dendrites are formed.

BACKGROUND OF THE INVENTION

Solid-state batteries (all-solid-state batteries, i.e. ASSBs) are batteries that use solid material(s) instead of a liquid electrolyte to carry lithium ions between the electrodes of the battery. ASSBs have lower flammability, higher electrochemical stability, and higher energy density in comparison to liquid electrolyte batteries. ASSBs are also lighter and faster to charge than liquid electrolyte batteries. The higher energy density of ASSBs is achieved by using high capacity lithium metal (Li-metal) as an anode material. Using Li-metal as an anode material, however, can accelerate the formation of undesired dendrites in the solid electrolyte. One potential cause of dendrite nucleation and growth in ceramic solid electrolytes (CSEs) is poor point-to-point contact between lithium metal and the ceramic solid electrolyte, which leads to high interfacial resistance and subsequently irregular lithium flux distribution. Dendrite propagation through a solid electrolyte may be further influenced by local mechanical conditions, such as dendrites growing through grain boundaries in polycrystalline CSEs due to low mechanical strength. Also, the intrinsic electronic conductivity of CSEs can lead to dendrite nucleation, and the dendrites may then grow during electrochemical cycling. The formation of dendrites causes reversible capacity loss (lower coulombic efficiency) and limits the rate performance of a battery cell, and can ultimately lead to complete failure of the battery cell, thereby reducing the battery's life cycle.

Typical strategies to suppress the formation and growth of dendrites are applicable to only specific material systems and generally involve the addition of material layers at the interface between the Li-metal anode and the solid electrolyte, surface preparation, or material doping. Addition of material layers undesirably increases the cost of fabricating an ASSB and may also modify important properties of a battery such as ionic conductivity and mechanical strength. Further, the high current rate requirements placed on modern commercial battery systems further promotes the growth of dendrites in ASSBs, which is a significant impediment to the effective use of ASSBs in modern battery systems. Hence, a need exists for a method to recover a battery cell after the formation of dendrites that is agnostic towards the materials forming the ASSBs and that can increase the cycle life and energy density of the ASSBs.

SUMMARY OF THE INVENTION

A method of electrochemically reviving a lithium-ion battery cell, in which dendrites are formed, is provided. The method includes providing a lithium-ion battery cell including a lithium-metal-containing electrolyte and one of a graphite or a lithium-metal-containing anode. Lithium dendrites are formed at an anode/electrolyte interface in the cell and extend into the electrolyte of the cell. The method further includes electrochemically healing the battery cell by actively applying a plurality of continuous low current density galvanostatic charge-discharge cycles to the battery cell. Lithium metal is thusly oxidized from tips of the dendrites thereby causing dissolution of the dendrites.

In some embodiments, the method is performed in-operando.

In some embodiments, the low current density is in the range of 1 to 20 μA $cm^{-2}$.

In some embodiments, the low current density is at least 10 times smaller than a critical current density of the battery cell.

In some embodiments, the low current density cycles are actively applied for a time period of at least 6 hours.

In specific embodiments, the low current density cycles are actively applied for a time period of between 6 and 16 hours.

In some embodiments, a time period to heal the battery cell decreases as an amount of the applied low current density decreases.

In some embodiments, one or more of cell polarization, bulk ionic resistance, and interfacial resistance of the battery cell is returned to at least 0.95 times an initial value prior to formation of the dendrites.

In some embodiments, the dendrites are removed due to high local current density at tips of the dendrites during the low current density cycles.

In some embodiments, the lithium-metal-containing electrolyte is a solid-state electrolyte.

In specific embodiments, the solid-state electrolyte is one of an inorganic solid electrolyte, a solid polymer electrolyte, and a composite polymer electrolyte.

In particular embodiments, the solid-state electrolyte is a garnet-type solid electrolyte.

In some embodiments, the lithium-metal-containing electrolyte is a liquid electrolyte.

A lithium-ion battery cell revived by the method is also disclosed. In some embodiments, the battery cell is an all-solid-state battery cell.

These and other features of the invention will be more fully understood and appreciated by reference to the description of the embodiments and the drawings.

DETAILED DESCRIPTION OF THE CURRENT EMBODIMENTS

Figures 1, 2:
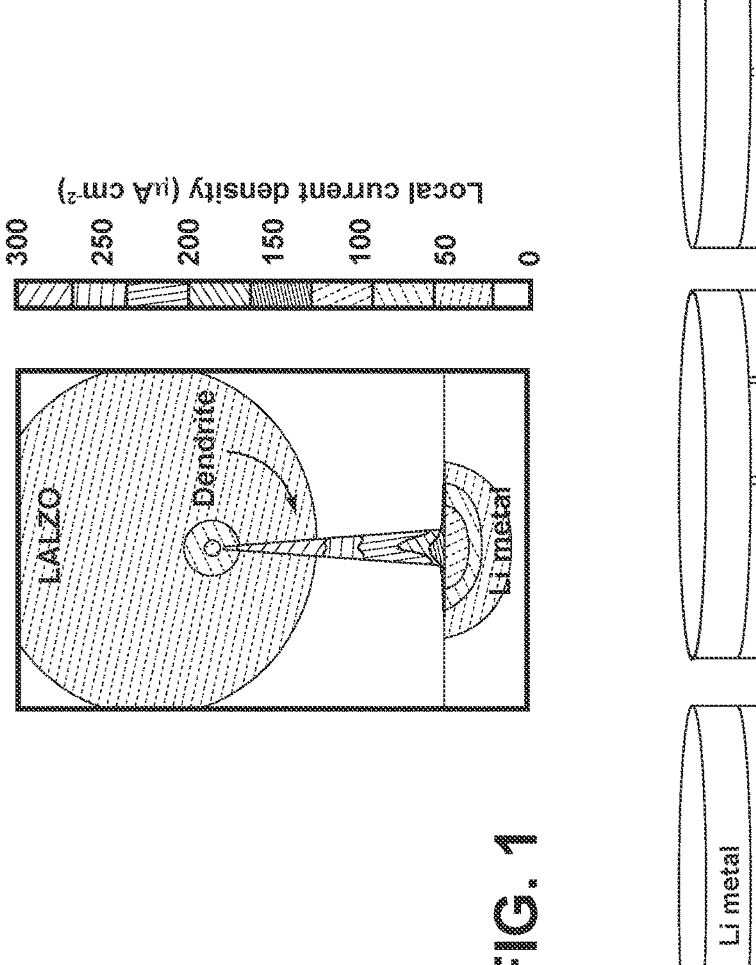
FIG. 1 is an illustration of local current density distribution at a lithium dendrite formed at an anode/electrolyte interface.
FIG. 2 is a schematic illustration of a mechanical process for electrochemical healing in accordance with embodiments of the disclosure.

As discussed herein, the current embodiments relate to a method of reviving a lithium-ion battery cell. The method may fully remediate cell failures caused by dendrite growth, thereby increasing the life cycle of a battery cell. The method provides the advantage of being non-destructive, i.e. the battery cell being revived remains intact and no components of the battery cell need to be separated from the cell or replaced. The method also provides the advantage of being capable of being performed as an in-operando technique such that the battery cell may be revived while it is its operational disposition, i.e. the battery does not have to be removed from the system in which it provides power for it to be revived by the method. Thus, the method is ideal for integration into battery management systems for the deployment of all-solid-state batteries.

The method first includes providing a lithium-ion battery cell including a lithium-metal-containing electrolyte and one of a graphite or a lithium-metal-containing anode. The graphite or lithium-metal-containing anode may comprise any graphite or lithium-based electrode active material known in the art, and the anode may particularly be elemental lithium. The electrolyte may be a solid-state electrolyte, in which case the battery cell is an all-solid-state battery cell. The solid-state electrolyte may be any one of an inorganic solid electrolyte, a solid polymer electrolyte, and a composite polymer electrolyte. In specific embodiments, the solid-state electrolyte is a garnet-type solid electrolyte such as an Al-doped LLZO garnet solid electrolyte. However, the solid-state electrolyte alternatively may be any composite, polymer, or other solid-state material, such as but not limited to LISICON (e.g. LGPS, LiSiPS, LiPS), argyrodite-like (e.g., $Li_6PS_5X$, X=Cl, Br, I), garnets (e.g., LLZO), NASICON (e.g., lithium-based NASICONs such as LTP, LATP, LAGP), lithium nitrides (e.g., $Li_3N$), lithium hydrides ($LiBH_4$), perovskites (e.g., LLTO), lithium halides (e.g., LYC, LYB), lithium phosphorous oxynitride (UPON), lithium thiophosphates ($Li_2S$—$P_2S_5$), polyether (PEO)-based electrolytes, polycarbonate-based electrolytes, polyester-based electrolytes, polynitrile-based electrolytes (e.g., PAN), polyalcohol-based electrolytes (e.g., PVA), polyamine-based electrolytes (e.g., PEI), polysiloxane-based electrolytes (e.g., PDMS), fluoropolymer-based electrolytes (e.g., PVDF, PVDF-HFP), gel polymer electrolytes, Ionogel electrolytes, and gel electrolytes. The electrolyte alternatively may be a liquid electrolyte. Example of liquid electrolytes typically include electrolyte salts (e.g. lithium salts, such as $LiPF_6$, $LiBF_4$, $LiCF_3SO_3$, $Li(SO_2CF_3)_2$, $LiClO_4$, ($C_4BO_8Li$), ($C_2BO_4F_2Li$), $LiPF_4C_2O_4$, Li $(CF_3SO_2)_2N$, ($Li(C_2F_5SO_2)_2N$), $LiCF_3SO_3$, $LiAlF_4$, $LiBF_4$, $Li(FSO_2)_2N$, $Li_2SO_4$, $LiAlO_2LiSCN$, LiBr, LiI, $LiAsF_6$, $LiB(Ph)_4$, $LiSO_3CH_3$, $Li_2S_x$) in an organic solvent (e.g. alkyl carbonates, such as ethylene carbonate, dimethyl carbonate, diethyl carbonate, etc. but not limited to, EC-DMC, EC-DEC, EC-PC, EC-PC-DMC, EC-PC-DEC, or EC-DEC-DMC).

Lithium dendrites are formed at an anode/electrolyte interface in the cell and extend into the electrolyte of the cell. The dendrites are undesirably formed during cycling of the battery cell. In the case of a solid-state electrolyte, the dendrites begin at the interface between the anode and solid electrolyte and propagate into the solid material forming the electrolyte, as shown, for example, in FIG. 2. Similarly, in the case of a liquid electrolyte, the dendrites "root" at the anode/electrolyte interface and extend into the liquid comprising the electrolyte.

The method further includes electrochemically healing the battery cell by actively applying a plurality of continuous low current density galvanostatic charge-discharge cycles to the lithium-ion battery cell. Under low current densities, lithium metal preferentially oxidizes from the dendrite tips, leading to their complete disappearance. The low current density may be at least 10 times smaller than a critical current density of the battery cell, and may be, for example, anywhere in the range of 1 to 20 μA $cm^{-2}$. The low current density galvanostatic cycles causes lithium metal to be oxidized from the tips of the dendrites, which promotes the dissolution of the dendrites to return the battery cell to its (near) pristine state. The low current density galvanostatic cycles may be applied to the battery cell for a healing time in the magnitude of hours, particularly more than 4 hours, more preferably more than 5 hours, even more preferably more than 6 hours. In some embodiments, the low current density galvanostatic cycles may be applied for a time period of between 6 and 16 hours, although it should be understood that the cycles may be applied for more than 16 hours or less than 6 hours. Particularly, the healing time may be defined as the time necessary for one or more of the cell polarization, the bulk ionic resistance, and/or the interfacial resistance of the battery cell to be returned to at least 0.95 times their initial values (prior to dendrite formation) by application of the low current density galvanostatic cycles. The magnitude of the low current density used for electrochemical healing may affect the degree and rate of healing, i.e. the healing time may be a function of the low current density. More specifically, the healing time period required to heal the battery cell may decrease as the magnitude of the low current density decreases. Stated differently, the healing of the battery cell is faster as the amount of the applied current density is lower. For example, at a low current density of 20 μA $cm^{-2}$, the healing time may be approximately 16 hours, whereas at a low current density of 1 μA $cm^{-2}$, the healing time may be shorter such as approximately 6 hours. It should be understood, however, that the specific low current density value and healing time may also be dependent upon the specific material constituting the electrolyte.

Without being bound by theory, it is believed that the electrochemical healing of the dendrites is primarily facilitated by a higher local current density at the dendrites, and particularly the dendrite tips, during cycling. Dendrite formation occurs by preferential electroplating of Li ($Li^{+}+e^{-} \rightarrow Li$) at a defect site at the Li/LALZO interface, which implies a higher local plating density at that region compared with the average current density observed. The same principle can be leveraged to preferentially remove dendrites once they are formed. Computational fluid dynamics simulations were carried out using the following parameters: an inward current density of 20 μA $cm^{-2}$; a lithium metal electronic conductivity of $1\times10^{7}$ S $cm^{-1}$; a LALZO conductivity of $1\times10^{-4}$ S $cm^{-1}$; a contact resistance of 700Ω $cm^{2}$; and a contact surface capacitance of $1.5\times10^{-3}$ F/$cm^{2}$. The simulations indicated that the dendrite tip clearly showed significantly higher local current density than that applied at the Li anode as shown in FIG. 1. Mass transport at the Li/LALZO interface is steady at low cycling rates, which allows for preferential stripping from the dendrite tips as shown in FIG. 2. The shorter electrode distance from the dendrite tips to the counter electrode as well as the lower surface area of the dendrite tips also facilitate this removal. At current densities higher than the healing densities disclosed herein, mass transport at the Li/LALZO interface at the dendrite tips may be unstable, so electrodissolution may not occur preferentially through the dendrite tips but rather through other regions of the working electrode as well.

EXAMPLES

The present method is further described in connection with the following laboratory examples, which are intended to be non-limiting.

The electrochemical healing of dendrites by the present method was exhibited in a battery cell including a garnet solid electrolyte. Commercial-grade $Li_{6.25}Al_{0.25}La_{3}Zr_{2}O_{12}$ (LALZO) powder was acquired from MSE Supplies and used as the solid-state electrolyte. The LALZO powder was stored in a glove box to avoid contamination from air. Initial x-ray diffraction (XRD) and scanning electron microscopy (SEM) characterization were performed on the pristine LALZO powder to assess the quality of the material. The GSAS II package was used for Rietveld refinement, and the parameters used for the XRD and Rietveld refinement are provided in the table below. The XRD confirmed that the purchased LALZO powder had a single cubic phase without any impurities. The SEM analysis of the purchased LALZO powder showed a uniform particle size distribution. Further, energy-dispersive x-ray spectroscopy (EDS) analysis showed the presence of the elements Al, La, Zr, and O in the powder. The absence of any other impurity elements confirmed the superior quality of the LALZO powder.

TABLE 1

XRD and Rietveld refinement parameters

| Parameter | Value |
|---|---|
| Wavelength (Å) | 1.5406 |
| Scan range (degree 2θ) | 15° < 2θ < 70° |
| Step size (degree 2θ) | 0.016° |
| Temperature (K) | 298 |
| wR (%) | 12.86 |
| Goodness to fit | 1.61 |
| Software | GSAS II |
| Background function | Chebyschev |
| Background coefficients | Refined 5 |
| Goniometer radius (mm) | 240 |
| Sample displacement (μm) | 146.5756 (refined) |
| Crystal system | Cubic |
| Space group | Ia3d |
| a (Å) | 12.98320 |
| Volume (Å$^{3}$) | 2188.493 |
| Weight (g mol$^{-1}$) | 843.92933 |
| Calculated density (g cm$^{-3}$) | 5.1228 |

Green films were pressed using a uniaxial press at 450 MPa followed by sintering at 1,200° C. for 12 hours in air. The green films were buried in motherpowder to compensate for Li loss while high-temperature sintering. Sintered pellets were stored in a glove box to minimize $Li_{2}CO_{3}$ contamination on the surface, which can lead to higher interfacial resistance at the interface between Li and LALZO. Sintered and densified LALZO was dry-polished in air progressively using polishing paper with a grit number from 800 to 2,000 to improve the interfacial contact at the Li/LALZO interface. XRD analysis of the polished pellets showed no impurity phases. The polished pellets were annealed in argon at 650° C. for 1 hour to remove $Li_{2}CO_{3}$ from the surface. A symmetric Li/LALZO/Li was assembled in a swagelok configuration. The symmetric cell was conditioned at 60° C. for 24 hours followed by exposure to 10 MPa of pressure for 12 hours at room temperature.

Figures 3A, 3B, 3C, 3D:
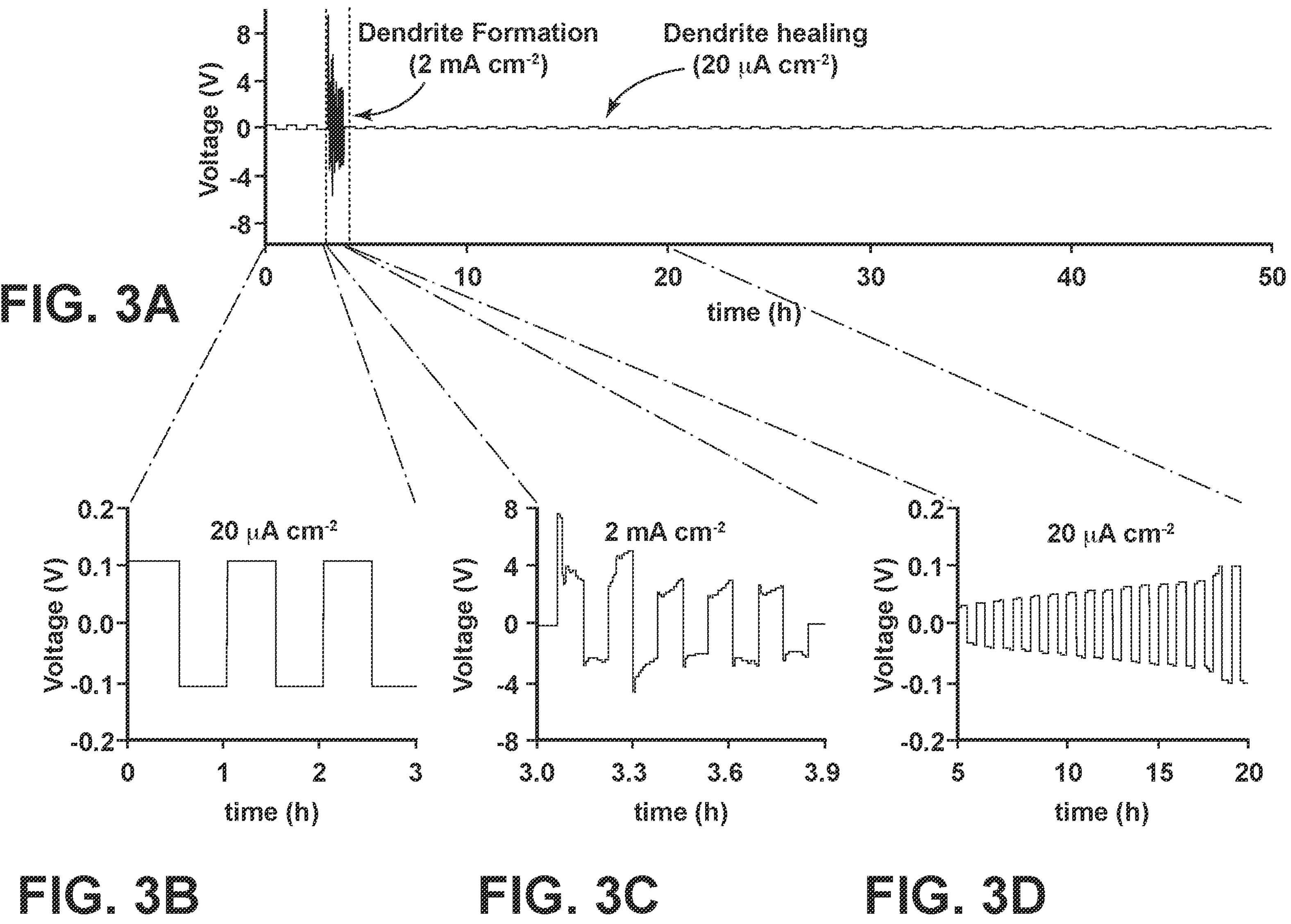
FIG. 3*a* is a graphical illustration of galvanostatic plating and stripping profiles of dendrite formation at a current density of 2 mA $cm^{-2}$ and galvanostatic healing at a current density of 20 μA $cm^{-2}$.
FIG. 3*b* is an enlarged view of the polarization profile of FIG. 3*a* for the first three cycles at 20 μA $cm^{-2}$.
FIG. 3*c* is an enlarged view of the polarization profile of FIG. 3*a* for five cycles at 2 mA $cm^{-2}$ to form dendrites.
FIG. 3*d* is an enlarged view of the polarization profile of FIG. 3*a* for the first few cycles at 20 μA $cm^{-2}$ for dendrite healing.
Figure 4:
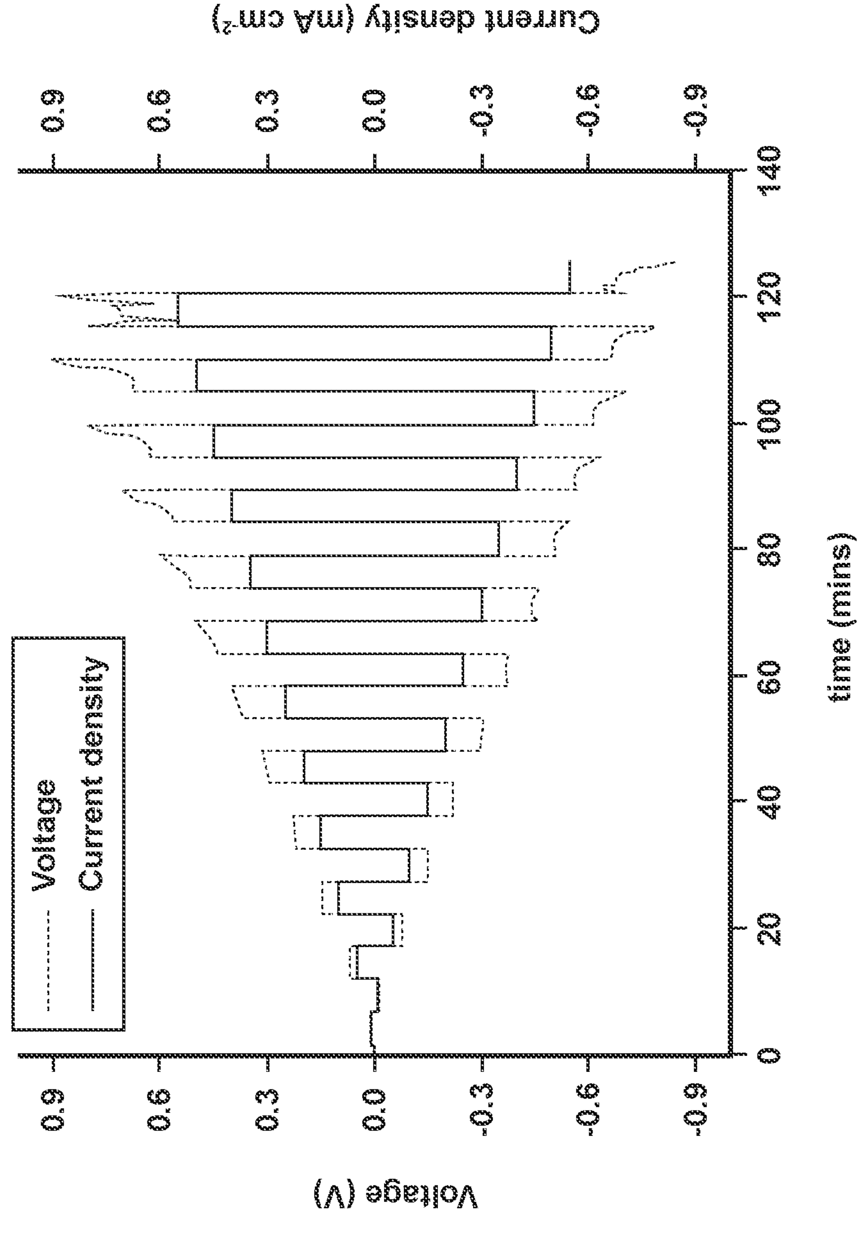
FIG. 4 is a graphical illustration of a determination of the critical current density in a Li/LALZO/Li symmetric cell.

All electrochemical analyses were done at normal pressure and room temperature. The first few plating and stripping cycles at 0 μA $cm^{-2}$ showed flat voltage profiles indicating stable electrodeposition and electrodissolution of the Li metal as shown in FIGS. 3*a* and 3*b*. After three cycles at lower current densities, bulk and interface resistance showed no clear differences, which verified that no degradation occurred in the cell at these current densities. The as-assembled symmetric cell showed a bulk resistance of approximately 1.2 kΩ $cm^{2}$, which correlates to $1.2\times10^{-4}$ S $cm^{-1}$ ionic conductivity and is typical for garnet-type LALZO materials. An interfacial resistance of approximately 4.2 kΩ $cm^{2}$ indicates good contact at the Li/LALZO interface. Separately, galvanostatic charge-discharge was performed to evaluate the critical current density (CCD) of the cell. An initial galvanostatic charge-discharge was carried out at 20 μA $cm^{-2}$. Plating and stripping cycles were then carried out for 5 minutes per cycle from 50 to 550 μA $cm^{-2}$ with a step of 50 μA $cm^{-2}$ each successive cycle as shown in FIG. 4 in order to evaluate the CCD. The CCD for the Li/LALZO/Li cell was determined to be 0.55 mA $cm^{2}$.

Figures 5, 6:
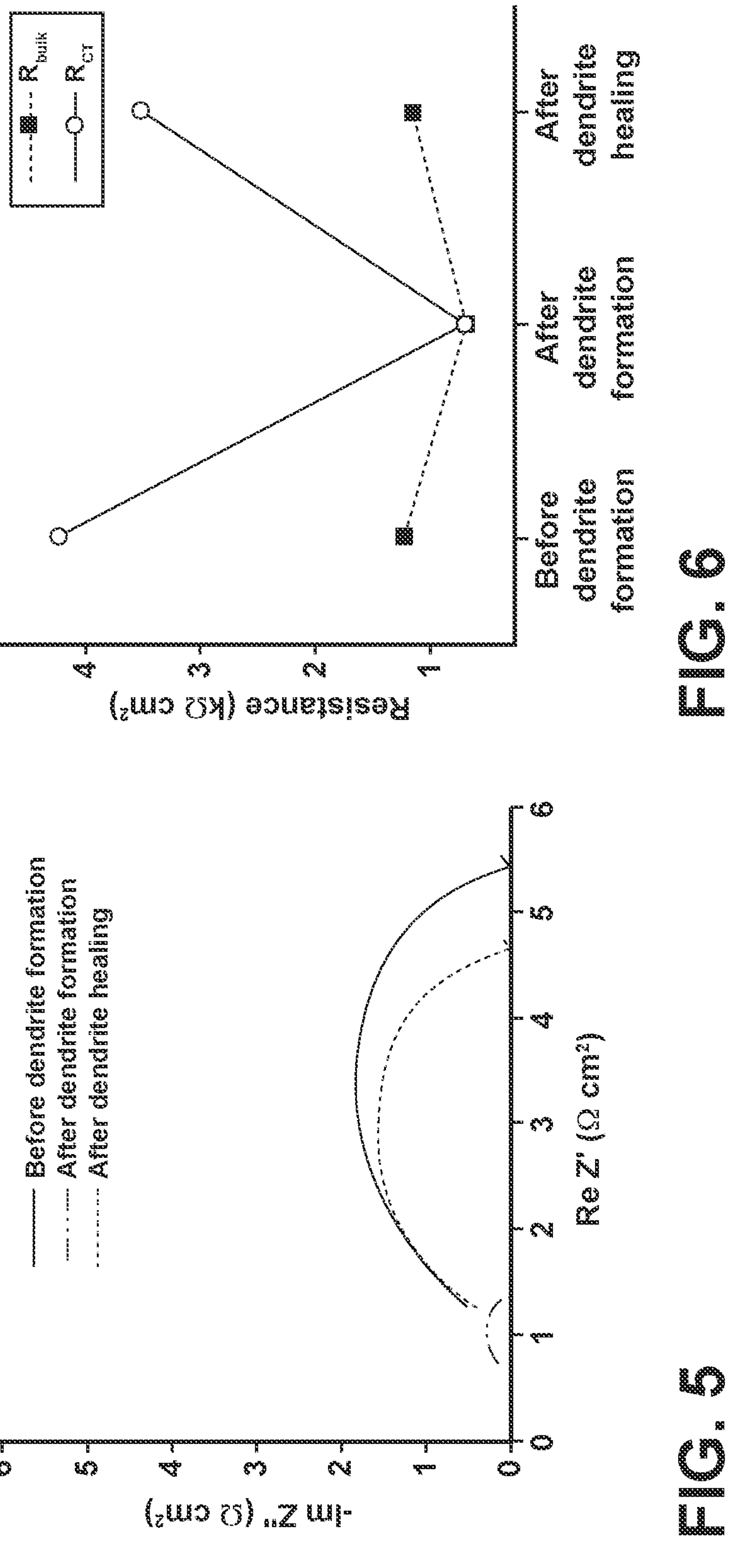
FIG. 5 is a graphical illustration of electrochemical impedance spectroscopy (EIS) profiles before dendrite formation, after dendrite formation, and after dendrite healing at 20 μA $cm^{-2}$.
FIG. 6 is a graphical illustration of bulk and interface resistance before dendrite formation, after dendrite formation, and after dendrite healing at 20 μA $cm^{-2}$.

Next, galvano static plating and stripping beyond the CCD was carried out on the cell to intentionally form dendrites. Plating and stripping were carried out at 2 mA $cm^{2}$ for 5 minutes per cycle for 5 cycles as shown in FIGS. 3*a* and 3*c*. This corresponds to roughly 1.6 mAh $cm^{-2}$ (40 μm of Li) of cycled capacity. The voltage profiles showed an initial sharp increase of potential followed by a decrease. The unstable voltage profiles were an indication of nonplanar electrodeposition and dissolution of Li metal. For all five dendrite formation cycles, cell polarization gradually decreased as shown in FIG. 3*c*. This indicated an increase in the effective contact area between Li and LALZO and a decrease in the inter-electrode distance via dendrite propagation in the bulk. Additionally, the over-potential at the end of the high current discharge cycle is not zero, indicating that the cell is not shorted. Furthermore, this value is lower than the over-potential observed for the first high current cycle, which indicates propagation of dendrites within the system. The impedance spectra at the end of the high current cycling showed a significant decrease in the bulk as well as interfacial resistances as shown in FIGS. 5 and 6. The bulk ionic resistance after dendrite growth decreased by almost 50% to approximately 0.6 kΩ $cm^2$, whereas the interfacial resistance decreased by about 80% to approximately 0.7 kΩ $cm^2$. The lower bulk resistance for the cell arose from a lower electrode-electrode distance within the symmetric cell, whereas lower interfacial resistance arose from an increased Li/LALZO contact area. The increase in the Li/LALZO contact area stems from the dendrite propagation through the cell that exposes additional LALZO surface in comparison to the pristine cell. The formation of dendrites at applied current densities higher than the CCD was also validated by ex situ SEM imaging. Before SEM analysis, the Li foils were delaminated from the LALZO surface, and the pellet surface was polished. Planar and cross-sectional images of the pristine LALZO pellet showed a dense microstructure with small pores. In contrast, the surface and cross-section of the LALZO pellet after cycling above the CCD showed the clear presence of dendritic growths observed as darker shaded regions within the SEM micrographs.

After the formation of the dendrites, the cell was revived by cycling at 20 μA $cm^{-2}$ for 46 hours. During this operation, the cell polarization gradually increased from 10 s of mV back to the stable operating polarization of the pristine cell of 0.1 V as shown in FIGS. 3*a* and 3*d*. Correspondingly, the bulk and interfacial resistance showed an increase up to approximately 1.1 kΩ $cm^2$ and approximately 3.5 kΩ $cm^2$, respectively, as shown in FIGS. 5 and 6. These values were consistent with those observed for the pristine cell. The increased cell polarization, along with the increase of the bulk and interfacial resistance, were clear evidence of dendrite removal from the system.

Figures 7A, 7B, 7C, 7D:
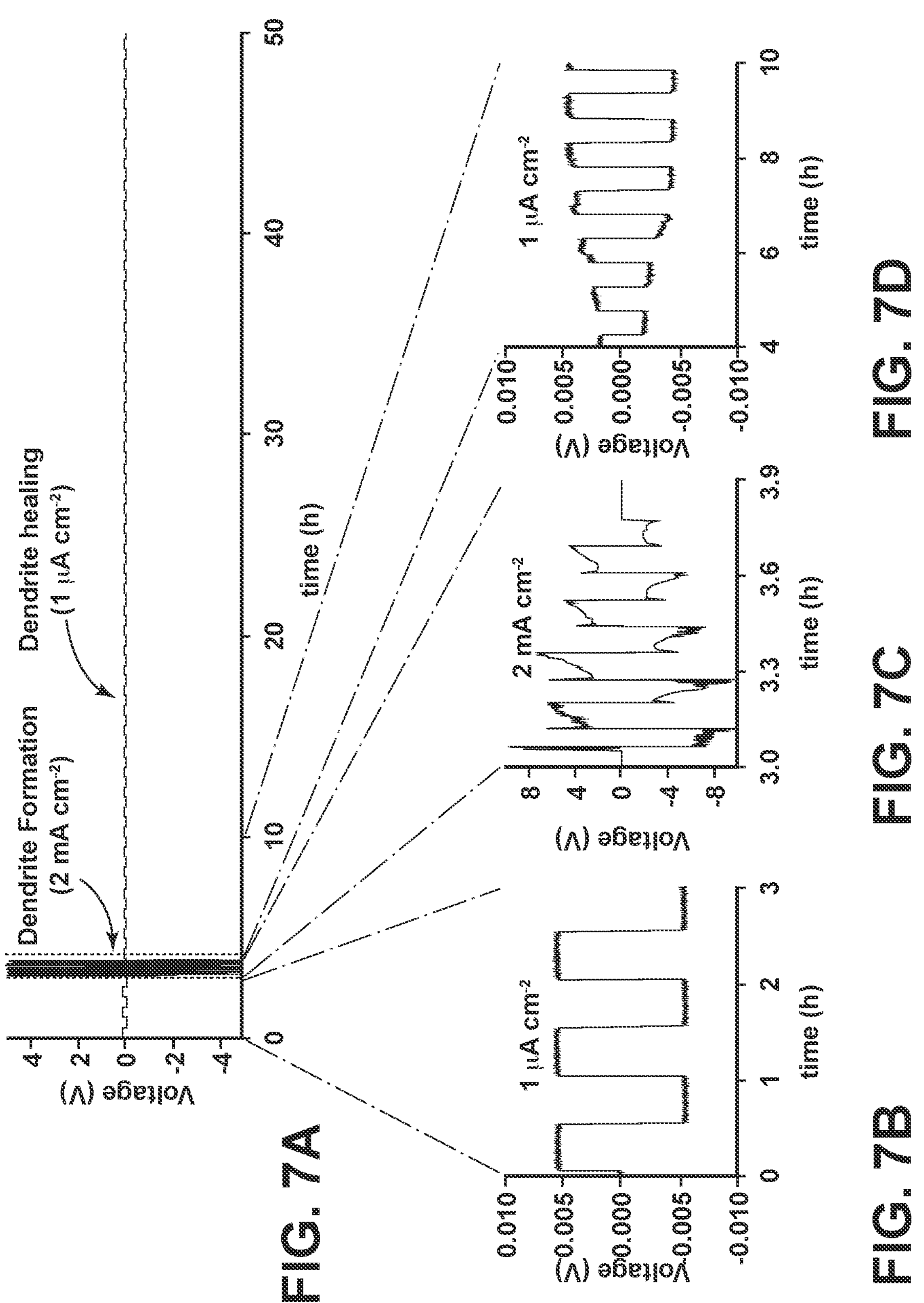
FIG. 7*a* is a graphical illustration of galvanostatic plating and stripping profiles of dendrite formation at a current density of 2 mA $cm^{-2}$ and galvanostatic healing at a current density of 1 μA $cm^{-2}$.
FIG. 7*b* is an enlarged view of the polarization profile of FIG. 7*a* for the first three cycles at 1 μA $cm^{-2}$.
FIG. 7*c* is an enlarged view of the polarization profile of FIG. 7*a* for five cycles at 2 mA $cm^{-2}$ to form dendrites.
FIG. 7*d* is an enlarged view of the polarization profile of FIG. 7*a* for the first few cycles at 1 μA $cm^{-2}$ for dendrite healing.
Figures 8, 9:
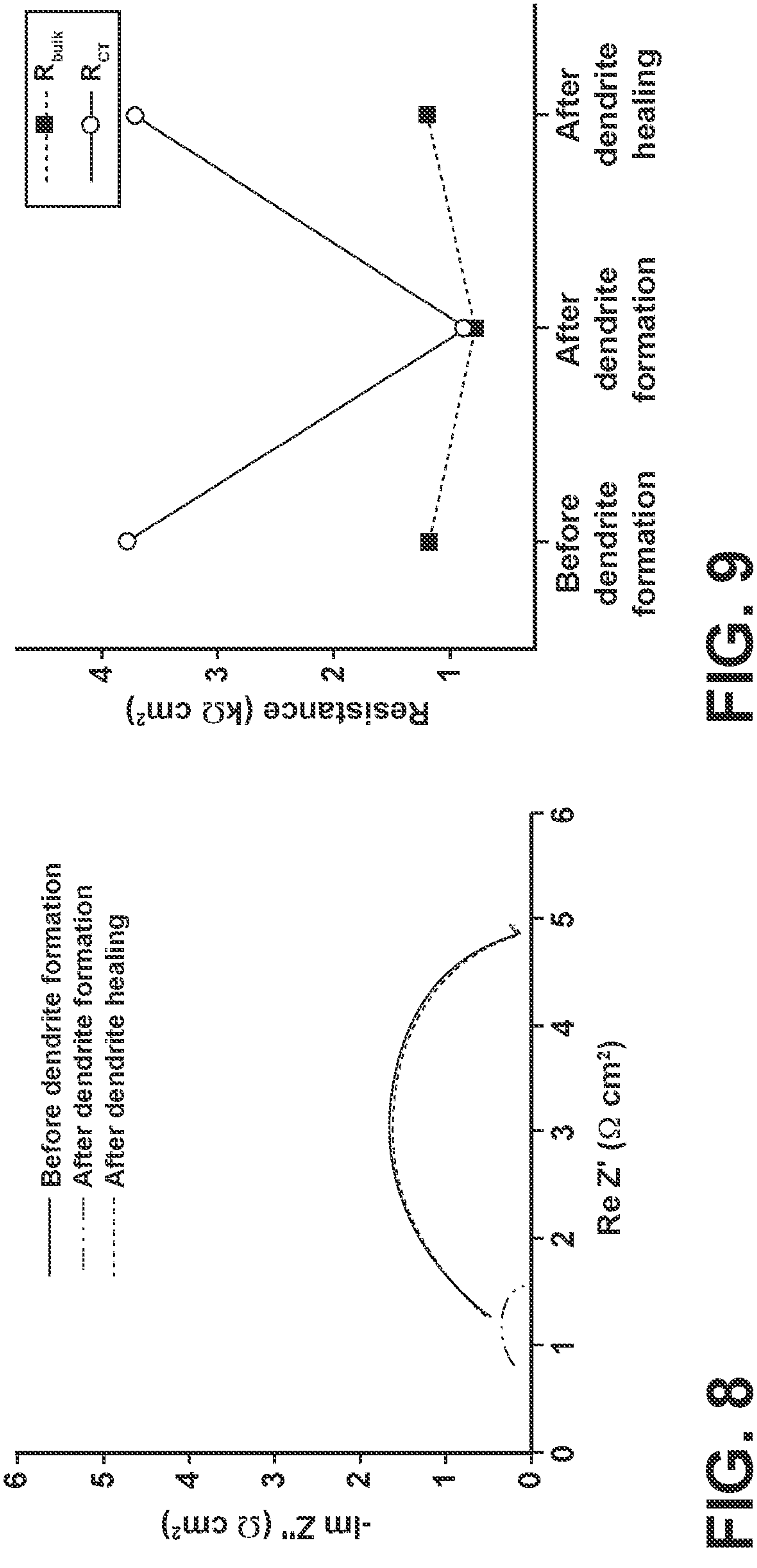
FIG. 8 is a graphical illustration of electrochemical impedance spectroscopy (EIS) profiles before dendrite formation, after dendrite formation, and after dendrite healing at 1 μA $cm^{-2}$.
FIG. 9 is a graphical illustration of bulk and interface resistance before dendrite formation, after dendrite formation, and after dendrite healing at 1 μA $cm^2$.

The current density used for electrochemical healing may affect the degree and rate of healing. Therefore, the effect of the electrochemical healing current density on the rate and efficacy of the dendrite healing was investigated in a second example shown in FIGS. 7*a-d*, 8, and 9. Dendrites were introduced in a symmetric cell in a manner similar to the process described above by electrochemically cycling at 2 mA $cm^{-2}$ and 5 minutes per each plating and stripping cycle as shown in FIGS. 7*a* and 7*c*. However, in contrast to the first example, the electrochemical healing was carried out at a lower current density of 1 μA $cm^{-2}$ as shown in FIGS. 7*a* and 7*d*. As shown in FIGS. 8 and 9, the electrochemical response of the system for the initial cycles as well as during the dendrite formation was consistent with that observed in the first example above. The bulk resistance after dendrite growth decreased to approximately 0.75 kΩ $cm^2$ whereas the interfacial resistance decreased to approximately 0.8 kΩ $cm^2$, which were consistent with values reported for the first example above. Subsequent healing of the cell occurred over a significantly shorter time frame at 1 μA $cm^{-2}$ (6 hours) compared with the time required for healing at 20 μA $cm^{-2}$ (16 hours). The healing time was identified as the time required for the cell to recover 0.95 times (i.e., 95%) the initial polarization observed for the pristine cell. The differences in the efficacy of dendrite healing and rate of healing between the two examples at two different current densities may be attributed to the transport limitations at the Li/LALZO interface. A higher healing current can potentially lead to an imbalance of fluxes at the dendrite tip (Li metal, electrons, Li+), which may limit the rate at which dendrites are preferentially eliminated from the system.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of reviving a lithium-ion battery cell in which dendrites are formed, the method comprising:
- providing a lithium-ion battery cell including a lithium-metal-containing electrolyte and one of a graphite or a lithium-metal-containing anode, wherein lithium dendrites are formed at an anode/electrolyte interface in the cell and extend into the electrolyte of the cell; and
- electrochemically healing the battery cell by actively applying a plurality of continuous low current density galvanostatic charge-discharge cycles to the battery cell, wherein lithium metal is oxidized from tips of the dendrites thereby causing dissolution of the dendrites;
- wherein the low current density is at least 10 times smaller than a critical current density of the battery cell.

2. The method of claim 1, wherein the method is performed in-operando.

3. The method of claim 1, wherein the low current density is in the range of 1 to 20 μA $cm^{-2}$.

4. The method of claim 1, wherein the low current density cycles are actively applied for a time period of at least 6 hours.

5. The method of claim 4, wherein the low current density cycles are actively applied for a time period of between 6 and 16 hours.

6. The method of claim 1, wherein a time period to heal the battery cell decreases as an amount of the applied low current density decreases.

7. The method of claim 1, wherein one or more of cell polarization, bulk ionic resistance, and interfacial resistance of the battery cell is returned to at least 0.95 times an initial value prior to formation of the dendrites.

8. The method of claim 1, wherein the dendrites are removed due to high local current density at tips of the dendrites during the low current density cycles.

9. The method of claim 1, wherein the lithium-metal-containing electrolyte is a solid-state electrolyte.

10. The method of claim 9, wherein the solid-state electrolyte is one of an inorganic solid electrolyte, a solid polymer electrolyte, and a composite polymer electrolyte.

11. The method of claim 10, wherein the solid-state electrolyte is a garnet-type solid electrolyte.

12. A lithium-ion battery cell revived by the method of claim 1.

13. The lithium-ion battery cell of claim 12, wherein the battery cell is an all-solid- state battery cell.

14. A method of reviving a lithium-ion battery cell in which dendrites are formed, the method comprising:

providing a lithium-ion battery cell including a lithium-metal-containing electrolyte and one of a graphite or a lithium-metal-containing anode, wherein lithium dendrites are formed at an anode/electrolyte interface in the cell and extend into the electrolyte of the cell; and electrochemically healing the battery cell by actively applying a plurality of continuous low current density galvanostatic charge-discharge cycles to the battery cell, wherein lithium metal is oxidized from tips of the dendrites thereby causing dissolution of the dendrites;

wherein the lithium-metal-containing electrolyte is a solid-state electrolyte;

wherein the low current density is in the range of 1 to 20 $\mu A\ cm^{-2}$.

15. The method of claim 14, wherein the method is performed in-operando.

16. The method of claim 14, wherein the low current density cycles are actively applied for a time period of at least 6 hours.

17. The method of claim 14, wherein one or more of cell polarization, bulk ionic resistance, and interfacial resistance of the battery cell is returned to at least 0.95 times an initial value prior to formation of the dendrites.

18. The method of claim 14, wherein the solid-state electrolyte is one of an inorganic solid electrolyte, a solid polymer electrolyte, and a composite polymer electrolyte.

19. The method of claim 18, wherein the solid-state electrolyte is a garnet-type solid electrolyte.

20. A lithium-ion battery cell revived by the method of claim 14.

* * * * *